United States Patent [19]

Wray

[11] 3,992,299

[45] Nov. 16, 1976

[54] SEWAGE TREATMENT DEVICES PARTICULARLY FOR MARINE APPLICATIONS

[75] Inventor: Stanley William Wray, Poole, England

[73] Assignee: Hamworthy Engineering Limited, Dorset, England

[22] Filed: Mar. 6, 1975

[21] Appl. No.: 555,803

[30] Foreign Application Priority Data

Mar. 27, 1974 United Kingdom............... 13703/74

[52] U.S. Cl............................. 210/152; 210/195 S; 210/220; 210/256
[51] Int. Cl.²......................................... C02C 1/08
[58] Field of Search .................. 210/7, 15, 63, 152, 210/195 M, 197, 220, 221 R, 256, 260, 519, 521, 534

[56] References Cited
UNITED STATES PATENTS

| 3,118,835 | 1/1964 | Butler et al. | 210/15 X |
| 3,374,893 | 3/1968 | Stretton | 210/195 M |
| 3,487,937 | 1/1970 | Koulovatos | 210/195 M |
| 3,533,508 | 10/1970 | Seipp et al. | 210/195 M |
| 3,618,779 | 11/1971 | Goodman | 210/195 M |
| 3,627,135 | 12/1971 | Goodman | 210/195 M |
| 3,666,111 | 5/1972 | Pielkenrood et al. | 210/521 |
| 3,744,634 | 7/1973 | Schlenz | 210/256 X |
| 3,746,638 | 7/1973 | Gensman et al. | 210/7 |

Primary Examiner—Charles N. Hart
Assistant Examiner—Robert H. Spitzer
Attorney, Agent, or Firm—Parmelee, Miller, Welsh & Kratz

[57] ABSTRACT

A sewage treatment apparatus of the activated sludge extended aeration type, particularly for use on board ships, comprises an inverted cone-shaped settling tank extending downwardly into an aerating tank. Sewage entering the aerating tank is constrained to flow around the outside of the settling tank, during which time it is aerated. The aerated liquid is then transferred to the settling tank, where sludge settling to the bottom thereof is removed and fed back to the aerating tank. An outlet means for removing treated liquid from just below the liquid surface in the settling tank is disposed at the center of said tank.

1 Claim, 6 Drawing Figures

SEWAGE TREATMENT DEVICES PARTICULARLY FOR MARINE APPLICATIONS

The present invention relates to sewage treatment apparatus of the activated sludge extended aeration type, particularly for marine applications.

Known in the art is a sewage treatment apparatus in which treatment of sewage is performed in three stages with a compartment of the apparatus corresponding to each. Sewage is broken down in the first compartment by the action of bacteria in the form of activated sludge which produce carbon dioxide, water, and more bacteria. The treated liquid is passed to a second compartment and allowed to stand for of the order of five hours so that any sludge which may have been carried along with the liquid can settle to the bottom and be returned to the first compartment. The treated liquid is passed to the third compartment which contains a chlorinating device to kill off any remaining harmful bacteria. The fully processed liquid may then be released into the environment or stored pending such release.

The present invention consists in a sewage treatment apparatus of the activated sludge extended aeration type, comprising one or more compartments, at least one of which is divided into a first and a second container, the second container having a tapered profile pointing downwardly with its top arranged approximately at the centre of the top of the first container, which is provided with inlet means, discharge means, flow directing means, and aerating means so that sewage entering via the inlet means passes around the outside of the second container and is aerated by the aerating means before being discharged by the discharge means, which is arranged to deliver the discharge liquid into the second container, there being provided in the second container a first outlet means, which is disposed at the centre of the second container and serves to remove supernatant liquid from below and near to the working level of the liquid, and a second outlet means for removing sludge from the bottom of the second container and returning it to the first container.

Preferably the flow directing means comprises a bulkhead arranged to prevent direct flow between the inlet means and discharge means.

This arrangement provides an extended path for the liquid being aerated and reduces short-circuiting, thus permitting improved and more consistent treatment. When used on board a ship, because the second container is positioned within and at or near to the centre of the first container with the first outlet means at the centre of the second container, the effects of the ship's motion will be eliminated or very much reduced because the difference between the levels of liquid in the first container and in the second container and the level of the liquid at the first outlet are relatively independent of the attitude of the containers. This overcomes the problem of liquid surging from one container to the next, for example from the first container to the second container, which would otherwise cause severe turbulence in the second container, thereby reducing the quality of the supernatant liquid. The inclusion of the first and second containers in one compartment leads to a more compact device by utilising the space below the tapered second container.

The surface dividing the first container from the second container may be a downwardly pointing cone or pyramid of substantially circular or rectangular cross-section.

The first outlet means may comprise a combined surface skimmer and flow control weir, the surface skimmer comprising a tray whose sides are arranged just below the working liquid surface in the second container so as to collect floating debris, the tray having an outlet means for returning this debris to the first container, and the flow control weir comprising a pipe having, at substantially the same level as the tray side, a hole through which supernatant liquid may be removed, the end of the pipe through which the liquid enters being arranged below the middle of the tray. Because the first outlet means is situated at the centre of the second container, which is itself at the centre of the first container, the effects, for instance, of rolling motion of a ship on which the apparatus is mounted will be eliminated or very much reduced and surging from the second container to a following container such as a chlorination tank, will be presented.

There may be provided a centrally mounted scraper chain arranged to remove sludge adhering to the inside surface of the second container.

Preferably the discharge means comprises a transfer channel and stilling chamber upwardly inclined in and extending into the first container from an aperture in the bottom portion of the second container.

The transfer channel and chilling chamber preferably extend upwardly above the working liquid surface in the first container.

The transfer channel and stilling chamber allows entrained air bubbles to rise to the surface of the first container rather than to rise to the surface of the second container, which would disturb its settling action.

A preferred embodiment according to the present invention will be described with reference to the accompanying drawings: in which.

Figure 1:
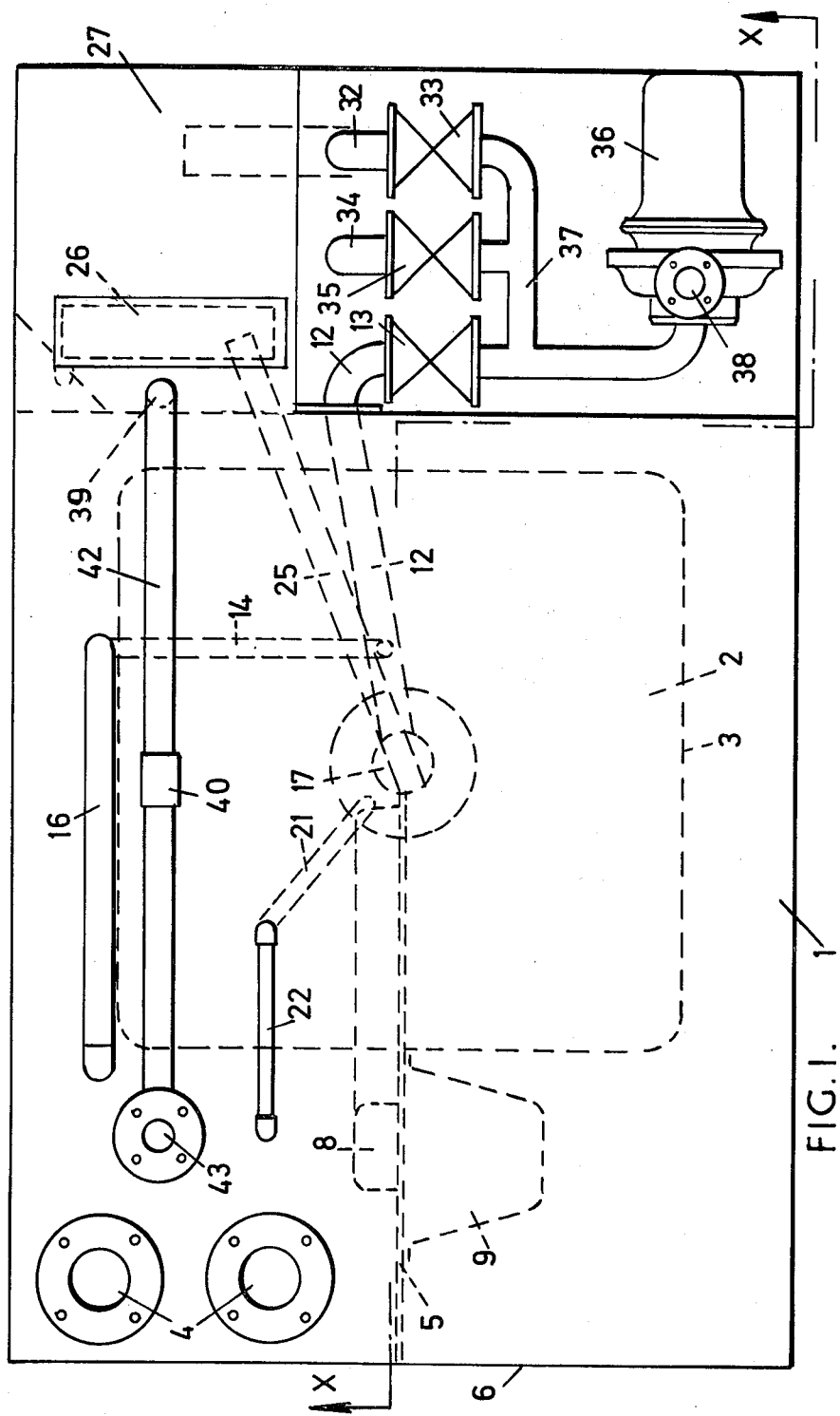
FIG. 1 is a plan view of a sewage treatment device according to a preferred form of the invention.
Figure 2:
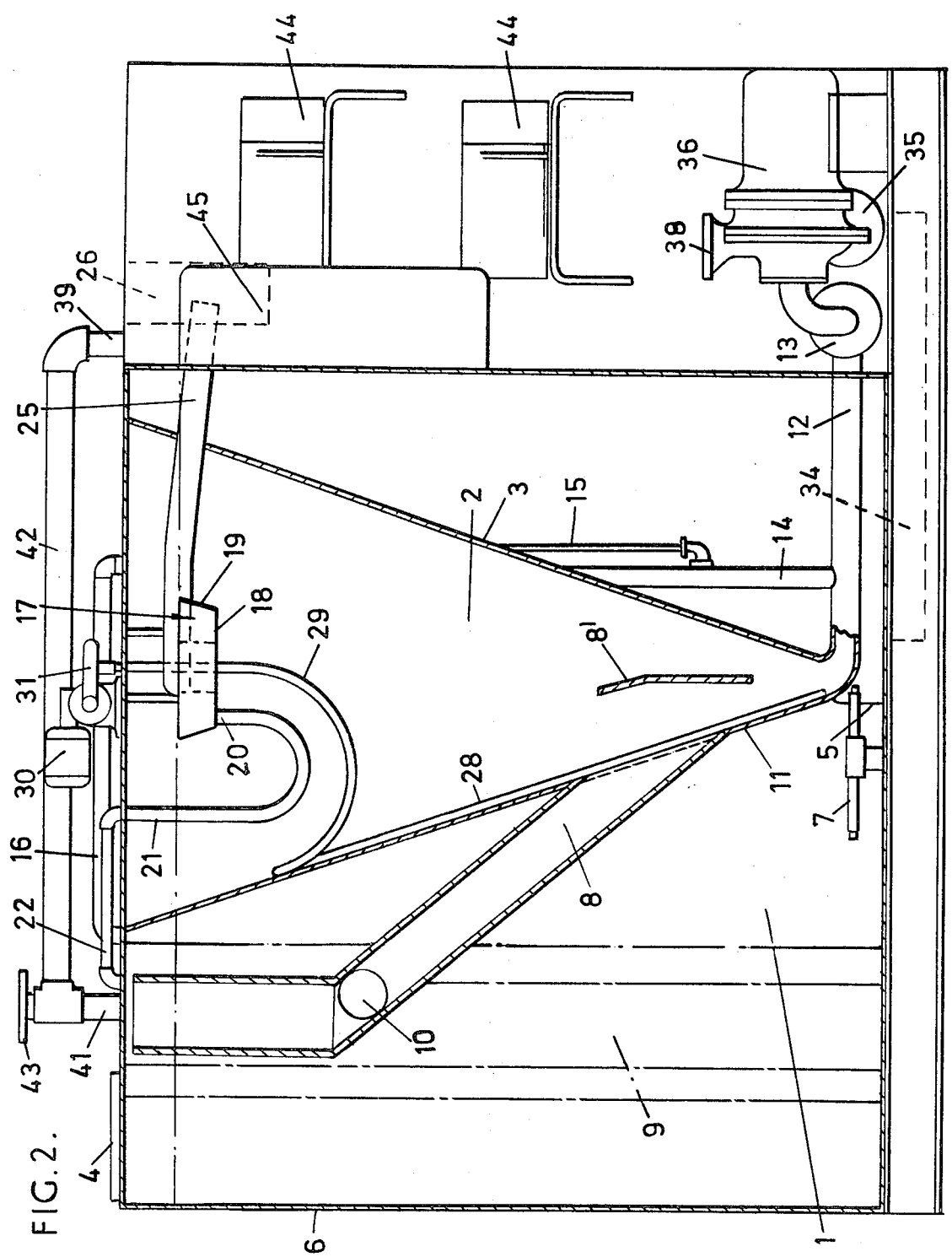
FIG. 2 is a side elevation in part section along X—X of FIG. 1.
Figure 3:
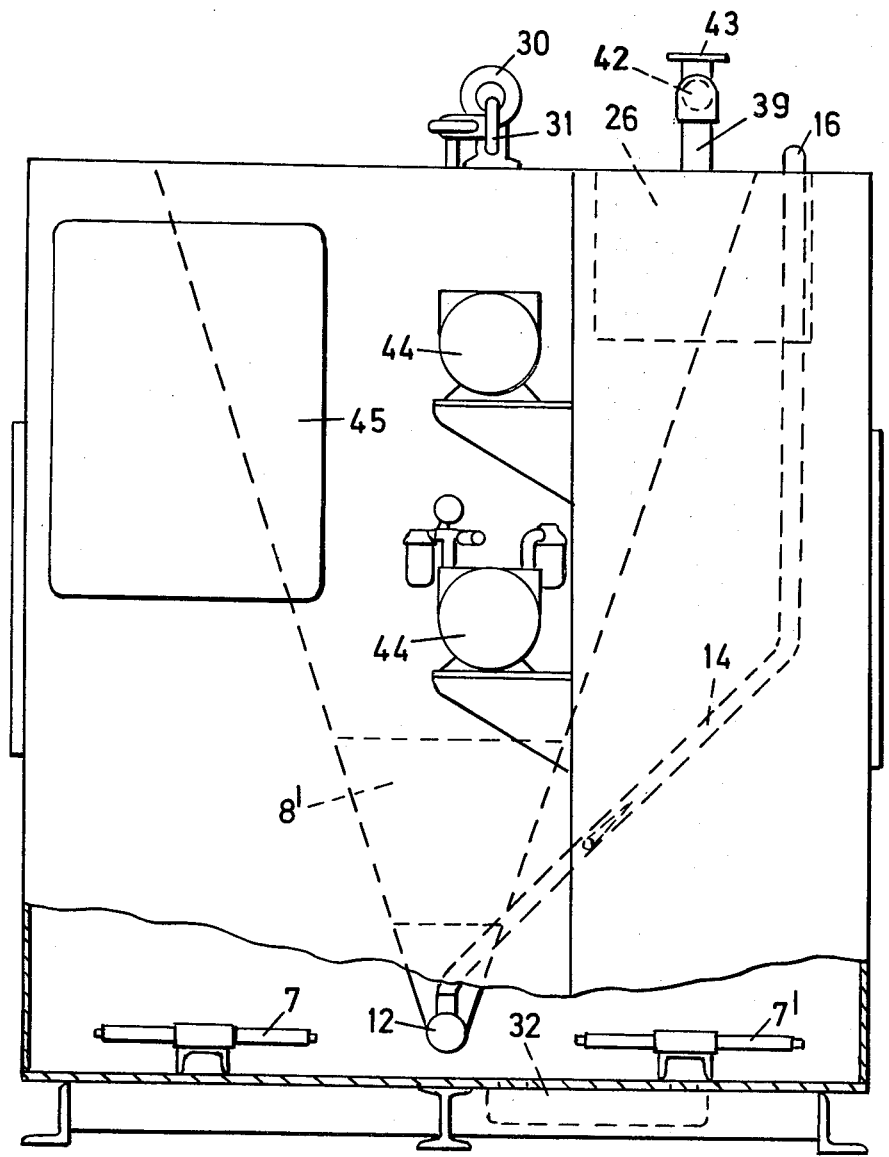
FIG. 3 is an end elevation of the sewage treatment device of FIG. 1.
Figure 4:
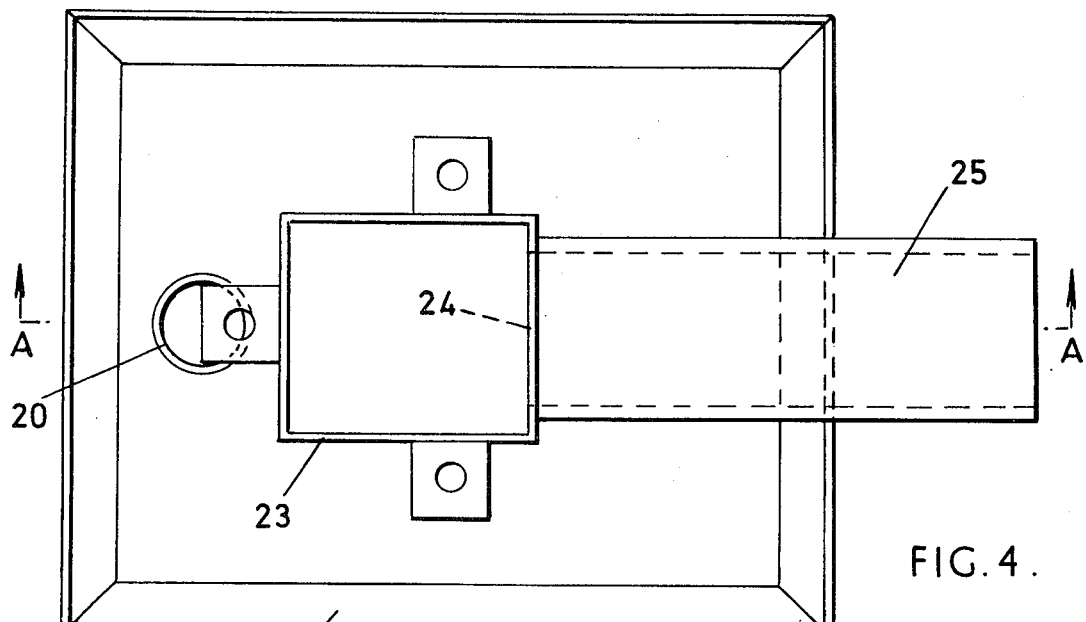
FIG. 4 is a plan view of an element of the apparatus of FIG. 1.
Figure 5:
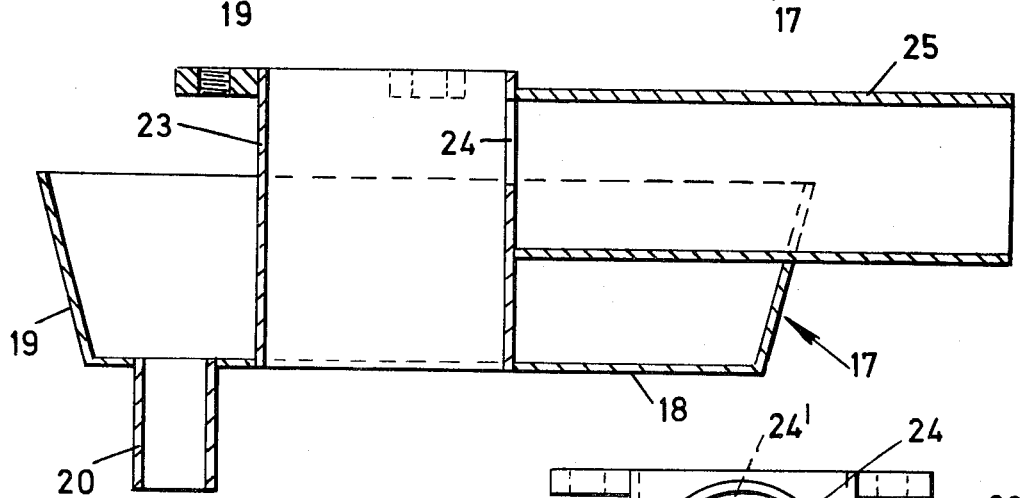
FIG. 5 is a cross-sectional view taken along A—A of FIG. 4.

The sewage treatment apparatus illustrated consists of two compartments a first compartment of which is divided into a first container or aerating tank 1 and a second container or settling tank 2 by a conical wall 3 of substantially square cross-section. Two sewage inlets 4 are provided in the aerating tank 1 on one side of bulkhead 5 which divides the left portion of the aerating tank i.e. the portion between the wall 3 and an end wall 6 of the apparatus.

Mounted on the floor of the aerating tank 1 are two aerating assemblies 7,7' disposed substantially on either side of the bulkhead 5. A transfer channel and stilling chamber 8 provides outlet means for the aerating tank 1 communicating with the settling tank 2. The inlet of the transfer channel and stilling chamber 8 comprises a hole 10 in the bulkhead 5 covered by a coarse screen 9, so that only liquid from the opposite side of the bulkhead to the side on which are situated the inlets 4 can enter the transfer channel and stilling chamber 8. The transfer channel stilling chamber 8 is extended upwardly above the surface of the liquid in the aerating tank. The low velocity of liquid flowing down the transfer channel and stilling chamber allows entrained air bubbles to rise to the surface before the liquid enters the settling tank 2. A vertical baffle 8' is provided in a bottom portion 11 of the settling tank 2 fixed to the wall 3 so as to face the opening to which the transfer channel and stilling chamber 8 is connected. This baffle serves to reduce turbulence in the settling tank during periods of high flow rate. The settling tank 2 is arranged at the middle of the aerating tank 1 with its bottom portion 11 just above the floor of the aerating tank 1. A pipe 12 leads from the bottom of the settling tank 2 to a drain valve 13 and to an air lift pipe 14 to which is connected an air supply pipe 15 and which leads via an activated sludge visual return indicator 16 comprising a transparent pipe back into the aerating tank 1.

Figure 6:
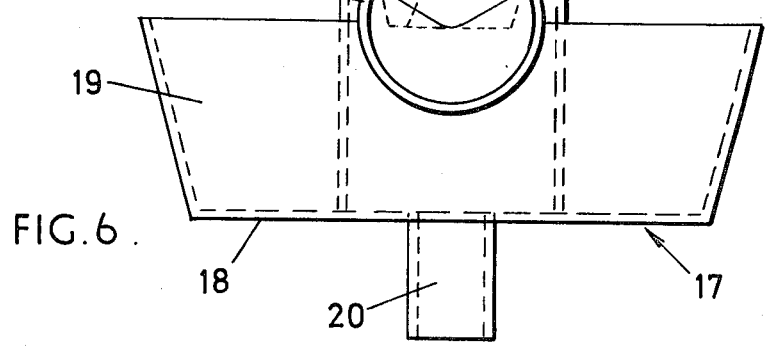
FIG. 6 is an end elevation of the element of FIG. 5.

Fixed on the axis of the settling tank 2 is a combined surface skimmer and flow control weir 17. The surface skimmer portion comprises a trough 18 with a wall 19 arranged to be just below the working level of liquid in the settling tank 2. In the floor of the trough 18 is provided an outlet pipe 20 which is connected to a further air lift 21 leading back via a pipe 22 into the aerating tank 1. The flow control weir comprises a tube section 23 in a side of which is a sector-shaped hole 24. Alternatively, the hole 24 may be of approximately semi-circular shape, as shown dashed at 24' in FIG. 6, in the case when throughput of the treatment apparatus is very uneven. A delivery pipe 25 is connected to the tube section 23 and leads into the second compartment. The bottom of the tube section 23 is arranged to be below the working level of liquid in the settling tank and the bottom of the hole 24 is arranged to be just below the said working level. A flexible chain scraper 28 mounted on a support 29 is rotatable by means of a motor 30 and a reduction gear 31 at approximately 12 revolutions per hour so as to sweep a portion of the inner surface of the wall 3.

The delivery pipe 25 feeds into a flow through type chlorinator 26 in the second compartment, the remainder of which forms a chlorine contact tank 27. The chlorine contact tank has an outlet pipe 32 leading to a drain valve 33. A further pipe 34 leads from the aerating tank 1 to a further drain valve 35. The other sides of the drain valves 13, 33, and 35, are connected together and to a drain pump 36 via a branch pipe 37. A drain pipe may be connected to an outlet connection 38 on the pump 36 for the disposal or storage of drained liquid.

Vent pipes 39, 40, and 41 are provided at the tops of the chlorine contact tank 27, the settling tank 2 and the aerating tank 1 respectively. These vent pipes are connected together via a pipe 42 to a pipe connection 43 to which a further pipe (not shown) communicating with the atmosphere may be connected. Two rotary compressors 44 supply compressed air to the aeration assemblies 7 and to the air lift pipes 14 and 21. A control panel 45 for controlling electrical equipment of the sewage treatment device is mounted on the outside of the device.

Operation of the sewage treatment apparatus is as follows. Sewage enters the aeration tank 1 through either or both of the inlets 4 and is immediately mixed with the contents thereof by the action of one of the aerator assemblies 7' which also provides oxygen for the respiration of aerobic bacteria. The liquid portion of the sewage, which is mainly composed of water and compounds of carbon, oxygen, hydrogen, and nitrogen, is decomposed by the bacteria in the form of activated sludge to form carbon dioxide, water, and more bacteria. The carbon dioxide produced in the sewage treatment apparatus can escape to the atmosphere through vent pipes 39, 40 and 41 and pipe 42. Sewage entering the aeration tank is confined by the bulkhead 5 to travel along a U-shaped path around the outside of the wall 3, the input rate of sewage and the dimensions of the apparatus being matched so that this journey takes approximately 24 hours. The liquid passes above the other aerator assembly 7 before being strained of non-degradable solids by the coarse screen 9 and flowing into the transfer channel and stilling chamber 8 through the hole 10. The transfer channel and stilling chamber allows entrained air bubbles to rise to the surface before the liquid enters the settling tank 2.

The liquid remains in the settling tank 2 for approximately five hours, during which time most of the sludge settles to the bottom of the tank and is returned to the inlet portion of the aerating tank through the pipe 12, the air lift 14, and the activated sludge visual return indicator 16. The air lift operates by injecting air via pipe 15 into the liquid therein so as to reduce the density of liquid in the upper part of the pipe, thus causing the liquid to rise and create a flow. Sludge adhering to the wall 3 is scraped off by the flexible chain scraper 28, which is rotated at approximately twelve revolutions per hour so as not to disturb the liquid in the settling tank. Solid matter floating on the liquid surface of the settling tank flows over the wall 19 of the surface skimmer into the trough 18 from which it is returned via the outlet pipe 20, the air lift 21, and the pipe 22 to the aerating tank 1. Clean supernatant enters the flow control weir from below the surface of the liquid in the settling tank in order to exclude solid floating matter and flows through the sector shaped hole 24 into the delivery pipe 25. The shape of the hole 24 permits an increased rate of flow if the level of liquid rises above its normal working level. As additional sewage enters the apparatus, this level rises and displaces the clear settled supernatant over the flow control weir.

The clean supernatant enters the chlorinator 26 and then flows into the chlorine contact tank 27 where any remaining harmful bacteria are killed. The treated and chlorinated liquid is drawn off from the chlorine contact tank through the pipe 32 and the drain valve 33 by the drain pump 36 which discharges the liquid through a pipe connected at 38 into the sea or into a storage tank for lateral disposal. The pipes 34, 12 and the valves 35, 13 are also connected to the pump 36 to allow the aerating tank 1 and the settling tank 2 to be periodically drained of sludge and for general maintenance.

Various modifications may be made within the scope of the invention. For instance, the transfer channel and stilling chamber 8, shown as having a substantially rectangular cross-section in FIG. 1, may have a circular cross-section.

I claim:

1. In a sewage treatment apparatus of the activated sludge extended aeration type particularly suited for use aboard ship, said apparatus including a compartment divided into first and second containers, said first container having a top portion and including inlet means, discharge means, flow directing means and aerating means, said second container having a downwardly pointing tapered profile, a top portion and a bottom portion, and including first and second outlet means, said second container being disposed within and with its top portion at the centre of the top portion of said first container, said first directing means being arranged to restrict the flow of sewage around the outside of said second container and, having been aerated by said aerating means, to said discharge means, which communicates with said second container so as to transfer liquid from said first to said second container, said first outlet means being arranged to remove supernatant liquid from below and near to the working level of liquid in said second container, said second outlet means being connected to the bottom portion of said second container and being arranged to return sludge from said bottom portion to said first container, the improvement consisting of disposing said first outlet means generally at the centre of the top portion of said second container so as to be at the centre of the working level of liquid therein and of forming said first outlet means as a combined surface skimmer and flow control weir, said surface skimmer comprising a tray having sides, a bottom and an outlet and said flow control weir comprising a pipe having an open end and a curved surface in which is provided a hole and a conduit connected to said hole, said tray sides being disposed just below said liquid working level in said second container so as to collect floating debris and said outlet communicating with said first container so as to return said floating debris thereto, said pipe extending through said bottom of said tray and being disposed with said hole at the same level as said tray sides and with said open end below the middle of said tray so that supernatant liquid from below said tray enters said pipe and overflows through said hole into said conduit for removal from said second container, whereby the effect of movement of the ship on the rate of flow of liquid through said first outlet means is minimized.

* * * * *